United States Patent
MacPhail et al.

[15] 3,682,054
[45] Aug. 8, 1972

[54] APPARATUS FOR APPLYING A TWO-COMPONENT EPOXY RESIN MARKING COMPOSITION

[72] Inventors: Larry S. MacPhail, Bel Air, Md.; Harold Ray, Simpsonville, S.C.; Oral P. Smith; Lee C. Hall, both of Cincinnati, Ohio

[73] Assignee: Traffic Control Materials & Machines Corporation, Bel Air, Md.

[22] Filed: June 18, 1970

[21] Appl. No.: 47,423

[52] U.S. Cl..................................94/44, 239/304
[51] Int. Cl..................................................E01c 19/12
[58] Field of Search.....239/150, 131, 304; 94/39, 44

[56] References Cited

UNITED STATES PATENTS

| | | | |
|---|---|---|---|
| 3,245,329 | 4/1966 | Nagin | 239/304 X |
| 3,070,822 | 1/1963 | Lipkins | 94/44 X |
| 3,018,704 | 1/1962 | Searight | 94/44 |
| 3,334,555 | 8/1967 | Nagin | 94/22 X |
| 3,266,392 | 8/1966 | Angelini | 94/44 |
| 2,875,675 | 3/1959 | Searight | 94/39 |
| 3,477,352 | 11/1969 | Harding | 94/44 |

Primary Examiner—Jacob L. Nackenoff
Attorney—McDougall, Hersh & Scott

[57] ABSTRACT

A truck includes a body in the form of a closed, heat-insulated chamber. The chamber contains separate, heated supply vessels for an epoxy resin and a curing agent. A cart which moves along the pavement behind the truck mounts a spray gun and a number of valves. The epoxy resin composition is continuously circulated through its supply vessel and one of these valves by heated conduits. The catalyst is also continuously circulated through its supply vessel and another valve by heated conduits. The valves are controlled by the operator of the cart for mixing the two components and spraying the resulting mixture as a coating on the surface to be marked.

5 Claims, 18 Drawing Figures

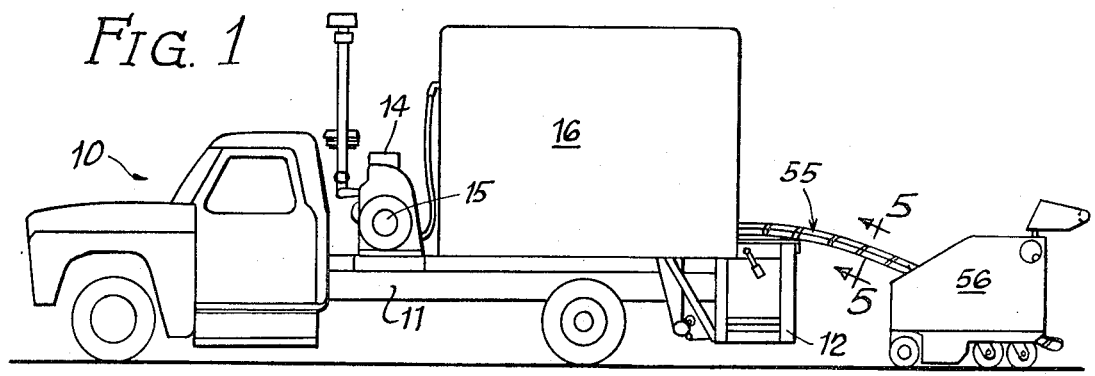
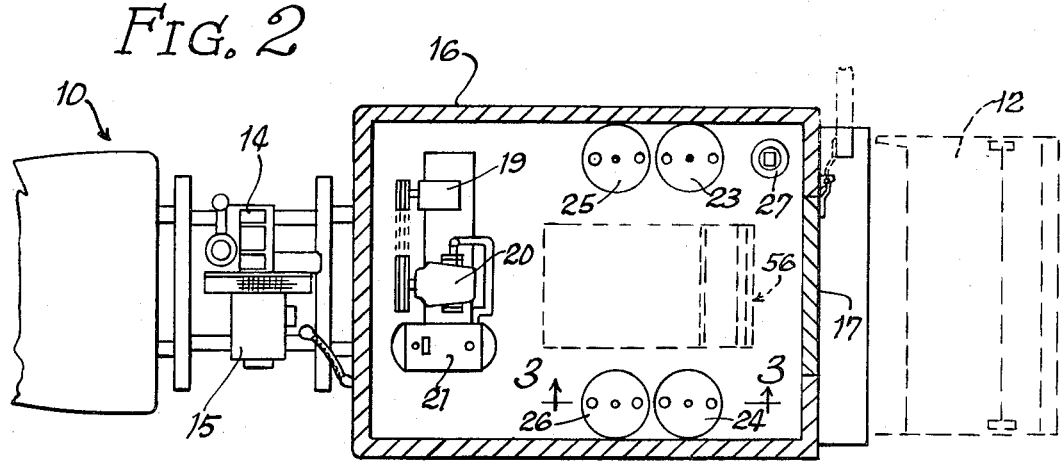
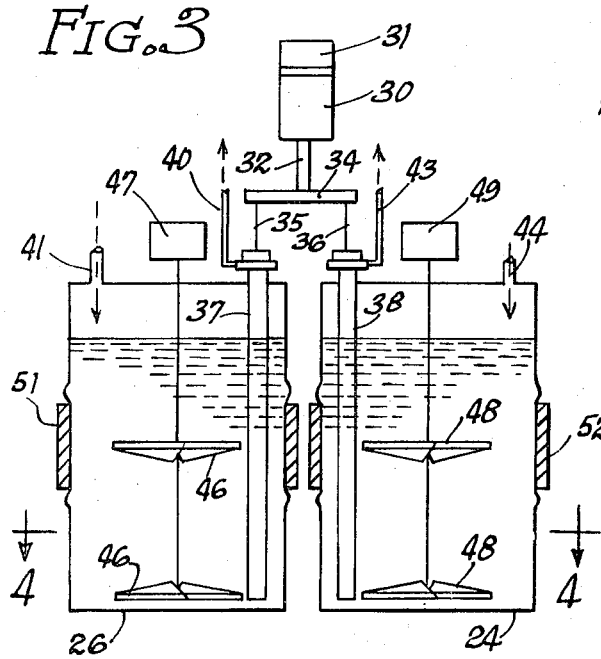
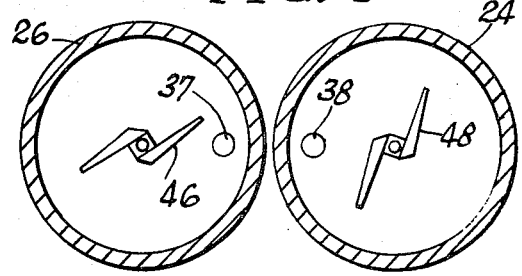
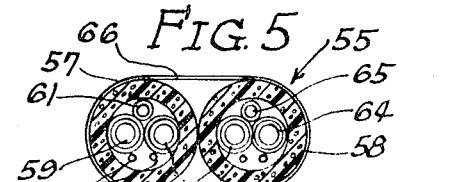
INVENTORS
Larry S. MacPhail, Harold Ray,
Oral P. Smith, Lee C. Hall
by McDougall, Hersh & Scott
Attorneys

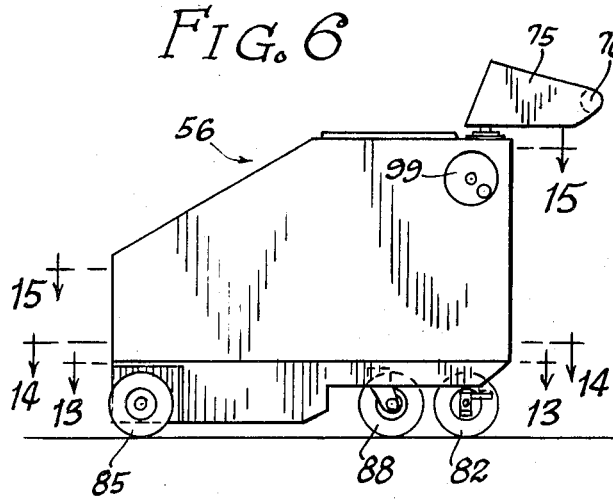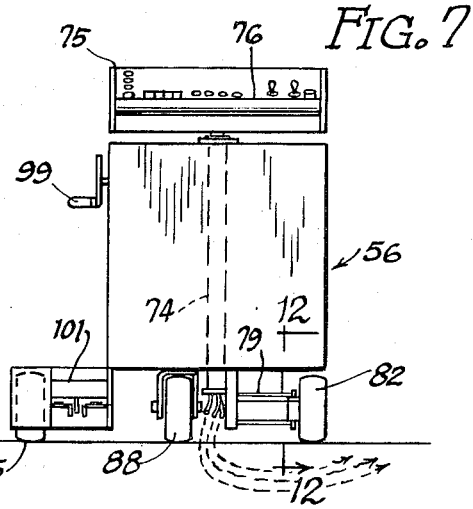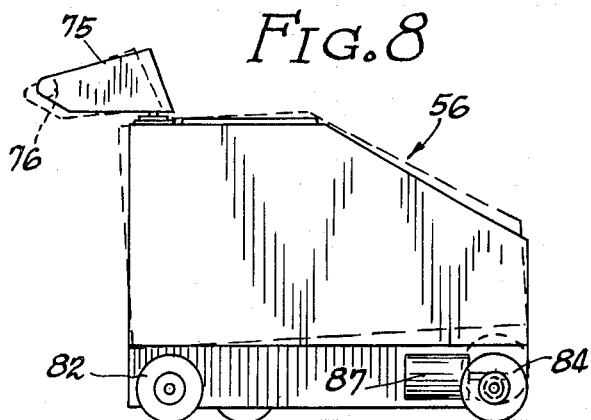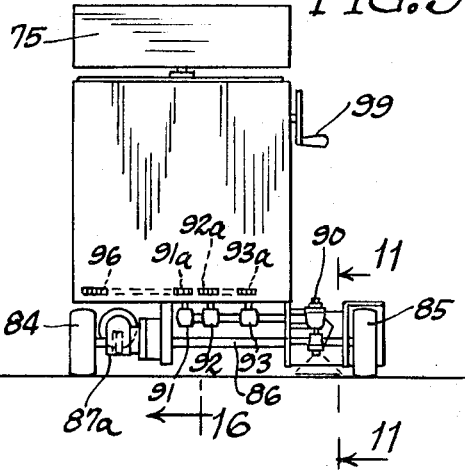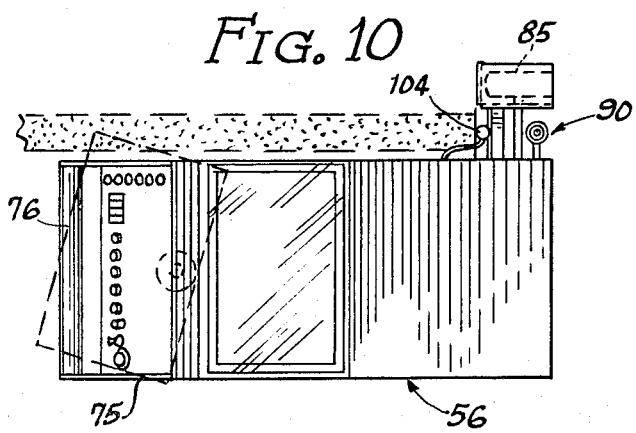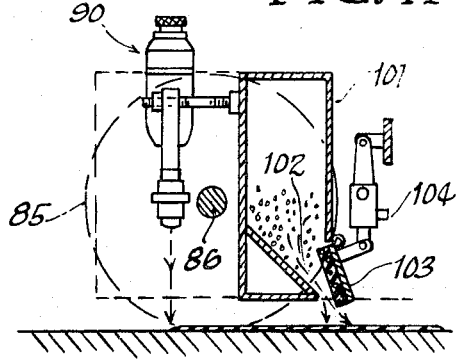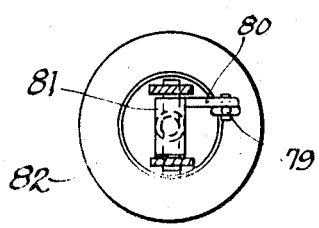

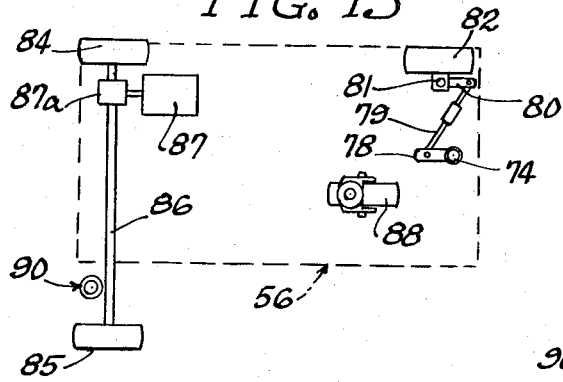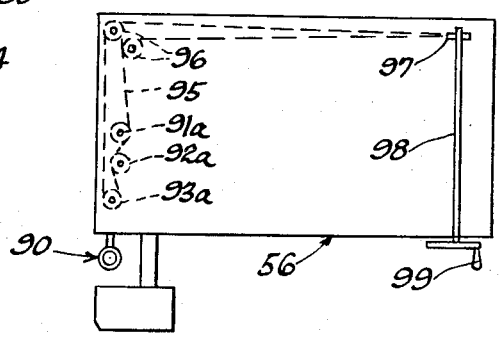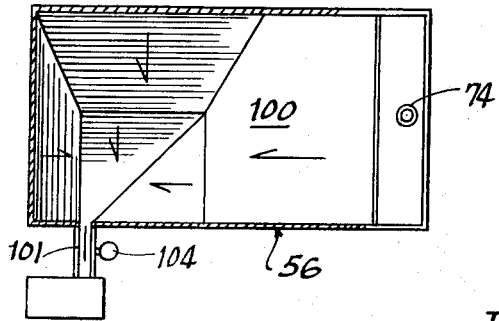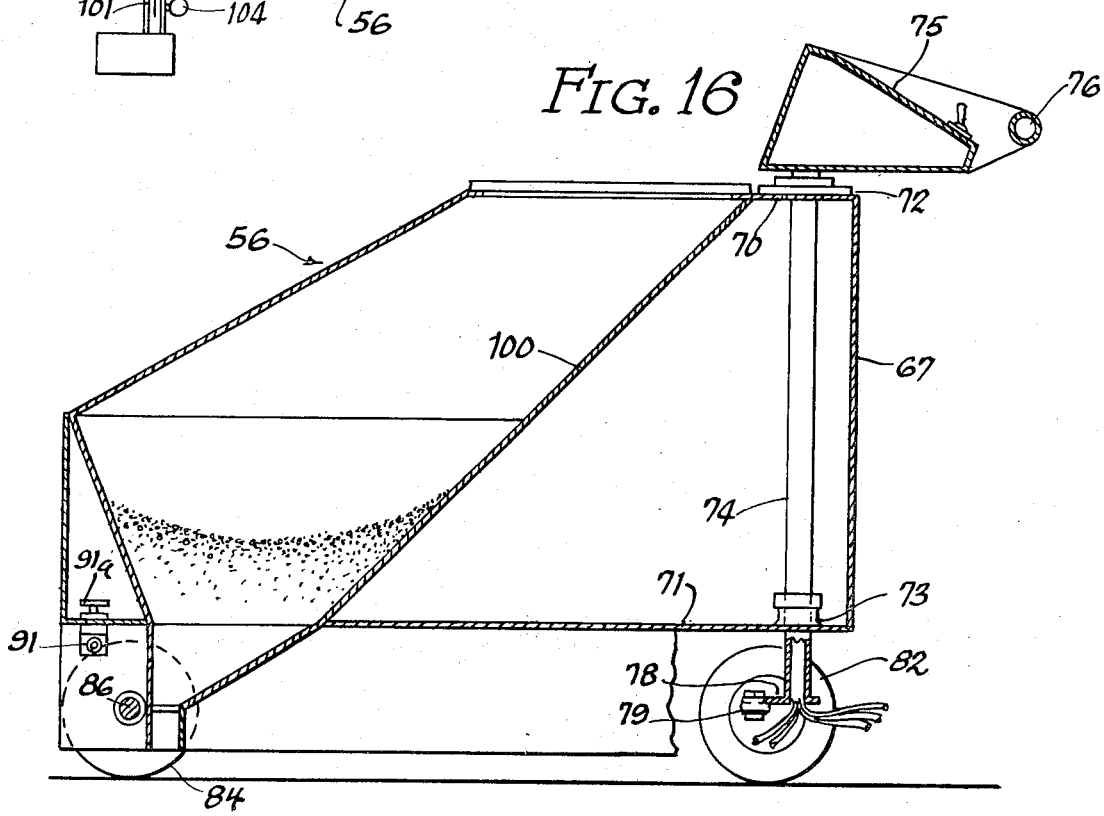

APPARATUS FOR APPLYING A TWO-COMPONENT EPOXY RESIN MARKING COMPOSITION

BACKGROUND OF THE INVENTION

Epoxy resin compositions produced for industrial and commercial uses are referred to as "two-component compositions," consisting of the epoxy material and a curing agent. When the epoxy and the curing agent are mixed together a thermo-reaction takes place resulting in the liquid epoxy being converted to a solid. Such epoxy resins possess a unique combination of properties which have led to their widespread use.

Attempts have been made in recent years to use these epoxy compositions for pavement markings because of a number of properties of these compositions which make them highly desirable for such use. Those properties or characteristics which are of particular interest in a pavement-marking material are easy cure at workable temperatures with no volatile by-products involved, low shrinkage during cure, high adhesive strength, excellent mechanical properties, and good chemical resistance.

Prior to the present invention, these attempts to use epoxy resin compositions for pavement markings have been unsuccessful. Viscosity, batch mixing, and pot-like constitute the main problems which have prevented the use of epoxy resin materials for pavement markings. The widespread development of modern expressways and airports has created a great demand for traffic control markings of an extremely durable nature and which can be applied quickly and with a minimum curing time thereby to minimize delay and interruption of traffic. There is also a substantial demand for such markings for parking lots, walkways, and for the floors of industrial buildings.

Heretofore, paint has been the primary material used for highway, airport, and other pavement-marking applications. Paint marking compositions have a number of undesirable properties including: (1) susceptibility to rapid erosion or wear; and (2) a rather substantial drying time which, in highway marking applications, for example, results in substantial traffic interruption periods.

The present invention provides a method and apparatus for quickly and expeditiously applying an epoxy resin marking composition which has the desirable properties mentioned above and which cures in a minimum time. Because of the outstanding properties of these compositions, including their durability, and because of their very short curing time, such compositions are more desirable than paint and compete favorably with the latter on an economic basis.

OBJECTS OF THE INVENTION

The primary object of the present invention is the provision of a new and improved method and apparatus for applying a two-component epoxy resin marking composition.

Another object of the present invention is the provision of a method and apparatus of the type described wherein controlled application of heat to the epoxy resin and curing agent solves the problem of viscosity control without the use of dilutants or solvents.

Still another object of the present invention is the provision of a method and apparatus of the type described wherein the problems of batch mixing and pot-life are eliminated by mixing the epoxy resin and the curing agent in a chamber adjacent the spray gun nozzle.

Another object of the present invention is the provision of a method and apparatus of the type described wherein both the epoxy resin and the curing agent are constantly circulated in continuous paths and maintained within a predetermined temperature range during such continuous circulation.

Yet another object of the present invention is the provision of an apparatus of the type described which includes unique means for maintaining the temperature of the epoxy resin and the curing agent within a predetermined range, such means including heated conduits and a heat-insulated chamber which contains the supply containers for the epoxy resin and the curing agent.

Another object of the present invention is the provision of an apparatus which fulfills the foregoing object and which further includes a self-propelled vehicle and a separate cart, such cart mounting a spray gun connected with the supply vessels by heated conduits.

Still another object of the present invention is the provision of an apparatus which fulfills the foregoing object and wherein such cart includes a glass bead hopper for controlled dispensing of such beads to the pavement markings.

These and other objects and advantages of the invention will be apparent from the following specification disclosing a preferred embodiment of the apparatus shown in the accompanying drawings.

DESCRIPTION OF THE DRAWINGS

FIG. 1 is a side elevation of the apparatus of the present invention;

FIG. 2 is a partial top view of the truck shown in FIG. 1 with the top of the insulated body being removed to show components therein;

FIG. 3 is an enlarged section taken along the line 3—3 of FIG. 2;

FIG. 4 is a section taken along the line 4—4 of FIG. 3;

FIG. 5 is an enlarged section taken along the line of 5—5 of FIG. 1;

FIG. 6 is an enlarged side elevation of the cart shown in FIG. 1;

FIG. 7 is a rear-end elevation of the cart of FIG. 6;

FIG. 8 is an elevation of the other side of the cart shown in FIG. 6;

FIG. 9 is a front elevation of the cart shown in FIG. 6;

FIG. 10 is a top elevation looking down on the cart as seen in FIG. 8;

FIG. 11 is an enlarged section taken along the line 11—11 of FIG. 9;

FIG. 12 is an enlarged section taken along the line 12—12 of FIG. 7;

FIG. 13 is a section taken along the line 13—13 of FIG. 6;

FIG. 14 is a section taken along the line 14—14 of FIG. 6;

FIG. 15 is a section taken along the line 15—15 of FIG. 6;

FIG. 16 is an enlarged section taken along the line 16—16 of FIG. 9;

DESCRIPTION OF A PREFERRED EMBODIMENT

Figure 17:
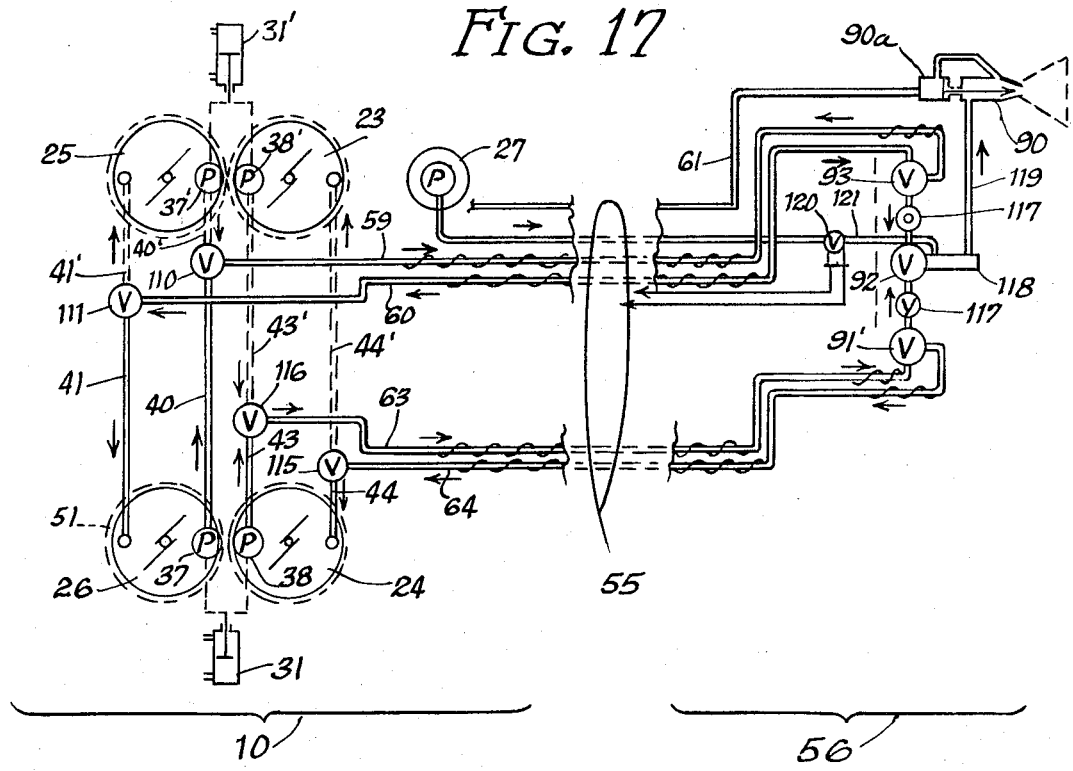
FIG. 17 is a schematic primarily showing fluid flow for the epoxy resin and the curing agent.

Referring to FIG. 1, a conventional truck 10 includes a chassis 11 mounting at the rear end thereof a hydraulically operated lift platform assembly 12. The chassis mounts a diesel engine 14 which drives an electric generator 15. The chassis 11 also mounts a closed body 16 lined with a suitable heat-insulating material and being provided with a rear door 17.

An electric motor 19 is supported on the floor of the body 16; this motor is powered by the generator 15. The motor 19 operates an air compressor 20 which is associated with an air storage tank 21. This compressor supplies air pressure for the spray gun and for the various pneumatically operated pumps and motors, all to be referred to below.

A pair of cylindrical drums or containers 23, 24 is supported on the floor of the body 16; these drums serve as the supply vessels for the epoxy resin composition. Another pair of drums 25, 26 serves as the supply containers or vessels for the curing agent or catalyst. Also mounted in the truck body 16 is a solvent container and pump unit 27 which will be referred to hereinbelow.

Referring to FIG. 3, a suitable pneumatically operated cylinder 30 is controlled by a solenoid actuated four-way valve 31. The piston rod 32 of the pneumatically operated cylinder is connected to a yoke 34, the latter being connected to the operating members 35, 36 of a pair of pumps 37, 38, respectively. The pump 37, which is mounted in the curing agent drum 26, includes a supply or feed conduit 40. The return conduit for the container 26 is designated 41. Similarly, the pump 38 mounted in the epoxy drum 24 includes a supply or feed conduit 43. A return conduit in this drum for the epoxy composition is designated 44.

Circulating or mixing vanes 46 in the curing agent container 26 are constantly rotated by a pneumatically operated motor 47. Circulating or mixing vanes 48 in the epoxy container 24 are constantly rotated by a pneumatically operated motor 49.

An electrically operated band heater 51 is mounted on the curing agent drum 26 for maintaining the temperature of the curing agent at approximately 160° F. Another electrically operated band heater 52 is associated with the drum 24 for maintaining the temperature of the epoxy resin at approximately 160° F. At this time it should be mentioned that the drums 23, 25 are provided with pumps, motors and heaters, etc., identical to those components just described in connection with the drums of 24, 26 and will be referred to herein by the prime form of numeral.

A conduit or cable assembly, generally designated 55 (FIGS. 1 and 5), connects the various components within the truck body 16 with certain other components, to be hereinafter described, the latter components being mounted on a cart, generally designated 56. The conduit assembly includes a pair of tubes or hoses 57, 58 formed of heat-insulating material, such as foam rubber.

The hose 57 encloses supply and return conduits 59, 60 for the catalyst or curing agent. These conduits are heated by having resistance wiring embedded therein or encircling such conduits. The hose 57 also contains an air conduit 61 for operating a spray gun to be referred to below. The hose 57 may also contain electric lines 62 for supplying electric energy to solenoids which will also be referred to below.

The hose 58 contains a pair of heated supply and return conduits 63, 64, respectively, for the epoxy resin material. This hose also contains a conduit 65 for a suitable solvent material. The hoses 57, 58 are preferably secured together by a plurality of bands 66.

The cart 56 includes a suitable housing or framework 67. This housing includes upper and lower walls 70, 71 mounting respective journals 72, 73. These journals rotatably receive a hollow tube 74 mounting a steering console 75 at its upper end. This console includes a handle 76. It will be understood that an operator walking behind the cart 56 and grasping the handle 76 may impart rotation to the tube 74 for steering the cart as will be explained.

Turning to FIG. 13, it will be seen that an arm 78 is rigidly secured to the steering column 74. This arm is pivotally connected to a link 79, the latter being pivotally connected to an arm 80 rigidly connected with the supporting structure 81 of a steerable wheel 82.

The cart 56 is also supported by a pair of wheels 84, 85 mounted on an axle 86. This axle, which drives the wheel 84, is driven by an electric motor 87 through a worm reducer 87a. In order to minimize the tendency of the cart 56 to tip, the same is provided with an auxiliary support in the form of a caster wheel 88.

The cart 56 mounts a pneumatically operated spray gun assembly, generally designated 90. This spray gun, which is controlled by a solenoid 90a, has its nozzle directly downwardly for applying the marking composition in the form of a stripe for use in marking highways, runways, etc.

Three valves 91, 92, 93 (FIG. 9) control the supply of the epoxy composition and the curing agent to the spray gun. These three valves are mechanically opened and closed by having their operating members supporting sprocket wheels 91a, 92a, 93a (FIG. 14) engaged by a chain 95. This chain engages a pair of idler sprockets 96 and also an operating sprocket 97 mounted on a shaft 98. A crank 99 is mounted on the shaft 98 thereby providing a means for the operator to actuate the valves 91–93 simultaneously.

The housing 67 for the cart includes a hopper 100 for reflective devices, such as glass beads. This hopper communicates with an outlet chamber 101 having a discharge opening 102 (FIG. 11). This discharge opening may be selectively opened and closed by a door 103, the latter being operated by a solenoid operated air cylinder 104. This air cylinder is controlled by a suitable operating member on the console 75 as will be shown below.

Referring to FIG. 17, the supply conduits 40, 40′ from the curing agent containers 26, 25 are connected to a valve 110. This valve is connected to the curing agent supply conduit 59, the latter being connected to the valve 93. The curing agent return conduit 60 is connected at one of its ends to the valve 93 and at its other end to a valve 111. The valve 111 is connected by the return lines 41, 41′ to the curing agent tanks 26, 25, respectively. It will be apparent that when the valves 93, 110 and 111 are opened, and with the pumps 37', 38' operating, the curing agent will be continuously circulated between the curing agent tanks and the valve 93 on the cart 56. The valves 110, 111 are preferably of a type permitting selective use of both tanks 25, 26 simultaneously, or the use of one or the other of such tanks.

The supply lines 43, 43' from the epoxy resin tanks are connected to a valve 114. The epoxy resin supply conduit 63 extends between this valve and the valve 91 on the cart 56. The epoxy resin return conduit 64 extends between the valve 91 and a valve 115, the latter being joined to the tanks 23, 24 by the return lines 44, 44'. It will be understood that the valves 91, 114, 115 may be actuated for continuously recirculating the epoxy resin composition through the valve 91 and the tanks 23, 24.

A pair of one-way check valves 117 is connected between the valve 92 and the valves 91, 93 as indicated in FIG. 17. These one-way valves permit flow from the valves 91, 93 to the valve 93 and prevent reverse flow from the valve 92 to the other two valves 91, 93. The valve 92 is connected with a mixing chamber 118; this devices mixes the epoxy resin and the curing agent at a 1:1 ratio before passing through the conduit 119 which extends to the spray gun 90.

The conduit 65 connects the solvent container and pump assembly 27 to a solenoid operated valve 120. A conduit 121 extends between this valve and the mixing chamber 118. It will be apparent that when the valve 120 is opened and the solvent pump assembly 27 actuated, the solvent solution will be passed through the mixing chamber 118, line 119 and spray gun 90 for cleaning these components. During such operation, the valve 92 will be closed and the valves 91, 93 will be in their recirculating positions thereby to prevent the flow of the epoxy resin and the curing agent to the spray gun.

It will be understood that the generator 15 supplies electric power to the air compressor motor 19 and to the various components on the cart 56. The generator also supplies electrical energy to a suitable bus (not shown), the latter serving to energize the supply tank band heaters, the solenoid operated valves within the truck body 16 and the resistance heating wires associated with the flexible conduits extending between the truck 10 and the cart 56 for thermostatically controlling the temperature of the recirculating epoxy resin and curing agent at approximately 160° F. The insulated body 16 facilitates temperature control for the epoxy resin and the curing agent. The air compressor 20 supplies compressed air for all of the pneumatically operated components on the truck 10 and the cart 56.

Figure 18:
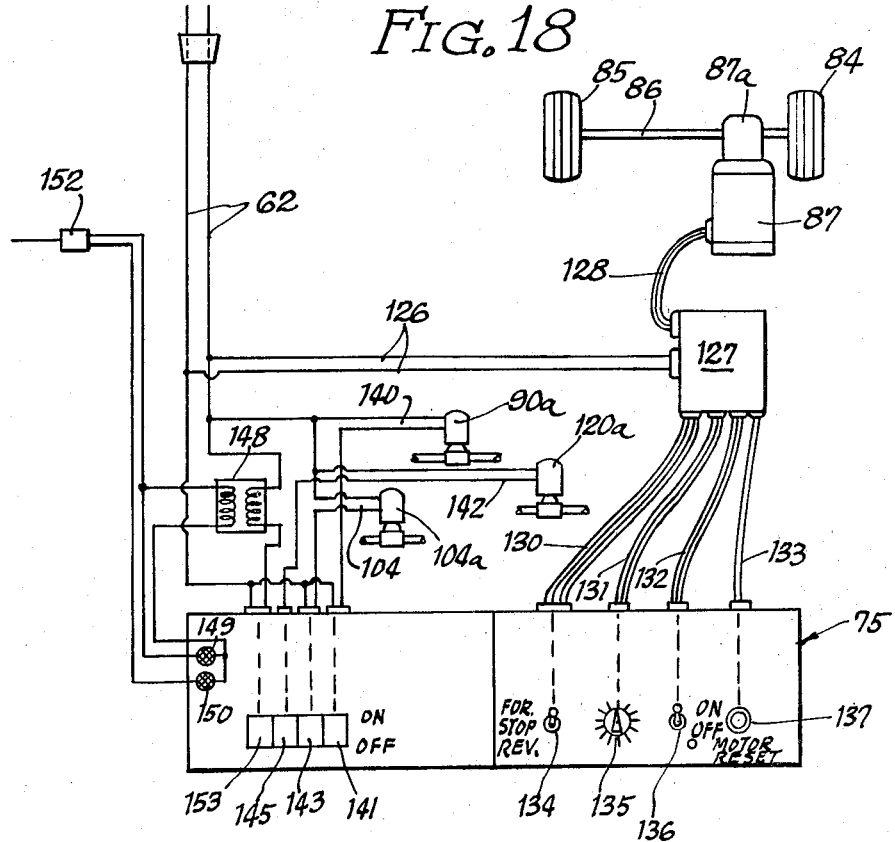
FIG. 18 is an electrical schematic.

Referring to FIG. 18 which shows primarily the electrical circuitry within the cart 56, a pair of electrical lines 126 are connected to the lines 62, the latter being contained within the conduit 57 as shown in FIG. 5. The lines 126 extend to a motor control unit 127, which unit is connected to the drive motor 87 by a cable 128. The unit 127 preferably includes a speed control circuit, such as a silicon controlled rectifier circuit, for varying the speed of the motor 87 which may be a 90 volt direct current motor. The speed control unit 127 is connected to the console 75 by four cables 130, 131, 132 and 133. These cables are connected to a "Forward-Stop-Reverse" switch 134, a "Speed Control" potentiometer 135, an "On-Off" switch 136 and "Motor Reset" switch 137, respectively. As is known to those skilled in the art, the potentiometer 135 controls the speed control unit 127 which in turn controls the speed of the drive motor 87.

A solenoid 90a for the spray gun 90 is energized from the lines 62 by a pair of lines 140, one of which lines is connected to a switch 141. Similarly, a solenoid 120a for the solvent valve 120 is connected to a pair of lines 142, one of which lines is connected to a switch 143. Finally, a solenoid 104a for the bead cylinder 104 is connected to a pair of lines 144; one of these lines is connected to a switch 145.

A transformer 148 provides a 12 volt power supply for an "On" light 149 and a "Low Bead Supply" light 150, the latter being activated by a suitable detector 152 mounted near the bottom of the bead hopper 100. The transformer is controlled by a switch 153. All of the switches 141, 143, 145 and 153 are "On-Off" switches which may be of the rocker type.

The pneumatic and electric systems for the present invention can take a variety of forms all within the purview of those skilled in the art. Accordingly, a detailed description and explanation of such systems are not necessary for an understanding of the present invention.

When the apparatus is operating, the several heaters are energized and the various air motors and air pumps are operated. The valves 91, 93 will be positioned to permit the constant recirculation of the epoxy resin composition and the curing agent. The constant recirculation of these two components while maintaining their temperatures at approximately 160° F prevents the development of problems due to the viscosity properties of the epoxy resin. When it is desired to spray a stripe of the marking composition, the valves 91, 93 are actuated to permit the flow of the epoxy resin and the curing agent to the valve 92. The valve 92 is opened simultaneously with actuation of the valves 91, 93 to cause mixing of the epoxy resin and the curing agent in the chamber 118. The mixture of the epoxy resin and the curing agent is supplied to the spray gun 90, the latter, of course, being operated to apply a marking composition in the form of a stripe for highway or runway marking. Mixing of the epoxy resin and the curing agent in the chamber 118 and the spray gun 90 just prior to application eliminates the problems of batch mixing and pot-life.

The lift platform assembly 12 provides a convenient means for loading and unloading the cart 56. The cart may be conveniently stored in the heat-insulated body 16 as shown in FIG. 2. For some applications, it may be desirable to mount the spray gun 90 (and the various other components on the cart 56) directly on the truck 10.

WE CLAIM

1. A mobile apparatus for applying a two-component epoxy resin marking composition comprising:
   a. a self-propelled vehicle and a cart mounted for movement along with said vehicle and relative thereto;
   b. a first supply vessel on said vehicle and adapted to contain one component of said composition;

c. means defining a mixing chamber and mounted on said cart;
d. first conduit means connecting said first vessel with said mixing chamber, the portion of said first conduit means extending between said vehicle and said cart being flexible;
e. first pumping means on said vehicle for forcing said one component from said vessel to said mixing chamber;
f. first heating means in adjacent heat exchange relationship with said first vessel and said first conduit means along substantially the entire length of the latter for maintaining the temperature of said one component within a predetermined range during flow thereof from said first vessel to said mixing chamber;
g. a second supply vessel on said vehicle and adapted to contain the other component of said composition;
h. second conduit means connecting said second vessel with said mixing chamber, the portion of said second conduit means extending between said vehicle and said cart being flexible;
i. second pumping means on said vehicle for forcing said other component from said second vessel to said mixing chamber;
j. second heating means in adjacent heat exchange relationship with said second vessel and said second conduit means along substantially the entire length of the latter for maintaining the temperature of said other component within a predetermined range during flow thereof from said second vessel to said mixing chamber;
k. spraying means mounted on said cart and connected with said mixing chamber means for spraying the resulting mixture as a coating on the surface to be marked.

2. The apparatus according to claim 1 wherein said cart includes a motor means for being self-propelled independently of said vehicle.

3. The apparatus according to claim 1 further defined by means on said cart for controlled dispensing of discrete reflective elements on said coating.

4. The apparatus according to claim 1 further defined by, means on said vehicle defining an insulated chamber, at least a substantial portion of said first and second supply vessels being disposed within said chamber.

5. The apparatus according to claim 1 further defined by, said vehicle mounting a solvent container and pumping means therefor, third conduit means including a flexible conduit portion communicating said solvent container with said mixing chamber means and said spraying means, and control means for alternately supplying said composition components and said solvent to said mixing chamber means and said spraying means.

* * * * *